(No Model.) 8 Sheets—Sheet 1.

O. A. SANFORD.
BOX MACHINE.

No. 552,782. Patented Jan. 7, 1896.

WITNESSES:
H. Walker
G. B. Hutchinson

INVENTOR
O. A. Sanford
BY Munn & Co.
ATTORNEYS.

(No Model.) 8 Sheets—Sheet 3.

O. A. SANFORD.
BOX MACHINE.

No. 552,782. Patented Jan. 7, 1896.

WITNESSES:
H. Walker
N. P. Hutchinson

INVENTOR
O. A. Sanford
BY
Munn & Co.
ATTORNEYS.

(No Model.) 8 Sheets—Sheet 4.

O. A. SANFORD.
BOX MACHINE.

No. 552,782. Patented Jan. 7, 1896.

FIG. 5

WITNESSES:
H. Walker
W. B. Hutchinson

INVENTOR
O. A. Sanford
BY Munn & Co
ATTORNEYS.

(No Model.) 8 Sheets—Sheet 6.

O. A. SANFORD.
BOX MACHINE.

No. 552,782. Patented Jan. 7, 1896.

WITNESSES:
H. Walker
W. P. Hutchinson

INVENTOR
O. A. Sanford
BY
Munn & Co.
ATTORNEYS.

UNITED STATES PATENT OFFICE.

OTIS A. SANFORD, OF NEWCASTLE, CALIFORNIA.

BOX-MACHINE.

SPECIFICATION forming part of Letters Patent No. 552,782, dated January 7, 1896.

Application filed January 15, 1895. Serial No. 535,026. (No model.)

*To all whom it may concern:*

Be it known that I, OTIS A. SANFORD, of Newcastle, in the county of Placer and State of California, have invented a new and Improved Box-Machine, of which the following is a full, clear, and exact description.

My invention relates to improvements in machines for making boxes, and more particularly wooden boxes of rectangular shape; and the object of my invention is to produce a machine of this kind which is thoroughly automatic, is adapted to work very rapidly, nails the several parts of a box together in an efficient manner, and finally ejects the formed box from the machine.

To these ends my invention consists of certain features of construction and combinations of parts, which will be hereinafter fully described, and pointed out in the claims.

My improved machine comprises a mechanism for supporting and moving the end boards of the box, mechanism for placing one side board upon the end boards and nailing it thereto, mechanism for turning the end boards with the said side board through an angle of ninety degrees or approximately so, then placing a bottom board on the said side board and end boards and nailing the bottom board to the other parts of the box, thereupon again turning the box, so far as completed, to bring the unfinished side uppermost, and finally placing and nailing the second side board upon the bottom and end boards and discharging the box thus formed from the machine, the several mechanisms being operated by common power.

Reference is to be had to the accompanying drawings, forming a part of this specification, in which similar figures of reference indicate corresponding parts in all the views.

The machine is provided with a suitable and substantial frame 10, which has near the top and at the front end a chute 11 adapted to contain boards 12, which are used to form one side of the boxes, and the boards are pushed one by one from the chute bottom by a slide 13, which moves in suitable guideways and is held up to place by springs 14, which rest on suitable supports and press against abutment-blocks 15, which serve as guides for the slide 13.

Figure 6:
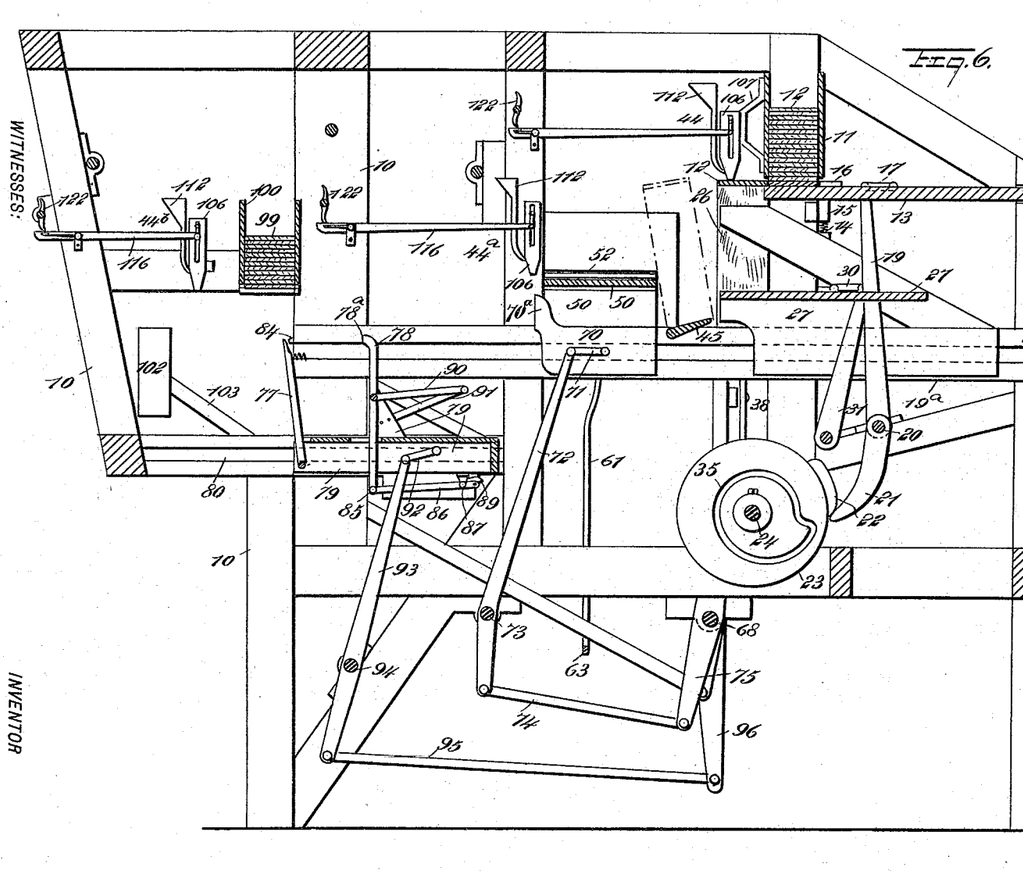
Fig. 6 is a longitudinal section on the line 6 6 of Fig. 4.

The slide 13 is provided with shoulders 16, which engage the boards 12, and the slide is connected by links 17, which move in slots 18 in the slide, (see Fig. 1,) to lever-arms 19, repressed by a spring 19$^a$ and carried by a shaft 20 which is journaled transversely in the machine-frame, and which is provided with a depending crank-arm 21, (see Fig. 6,) which is struck by a cam 22 of a cam-wheel 23, which is carried by the main shaft 24, and the latter is provided with a driving-pulley or balance-wheel 25 by which it is turned. The cam-wheel 23, as well as the other wheels on the main shaft 24, are provided with cam-grooves, which work the various levers hereinafter described, and as this is a common expedient the wheels are not shown in detail.

Figures 1, 2:
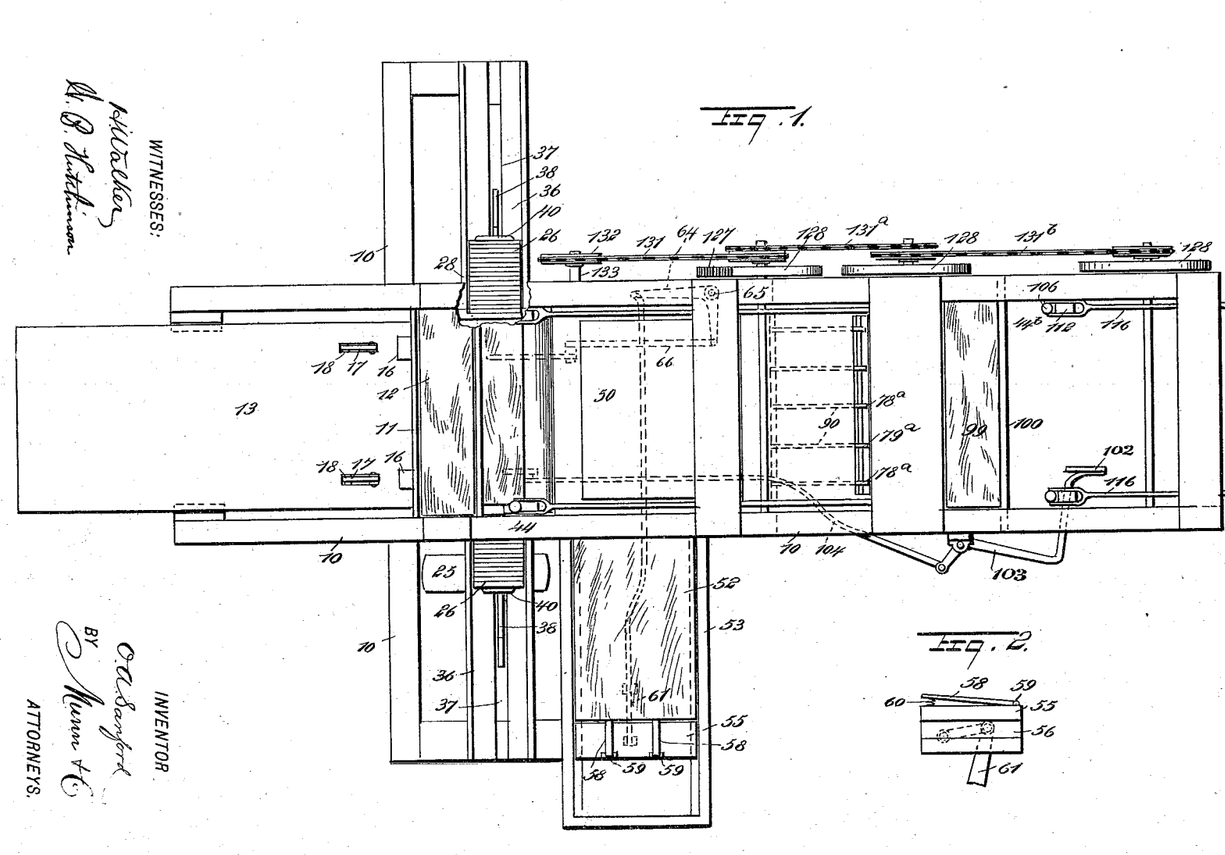
Figure 1 is a plan view of a machine embodying my invention.
Fig. 2 is a detail end view of one of the movable slides used in delivering box-bottoms to the machine.
Figure 4:
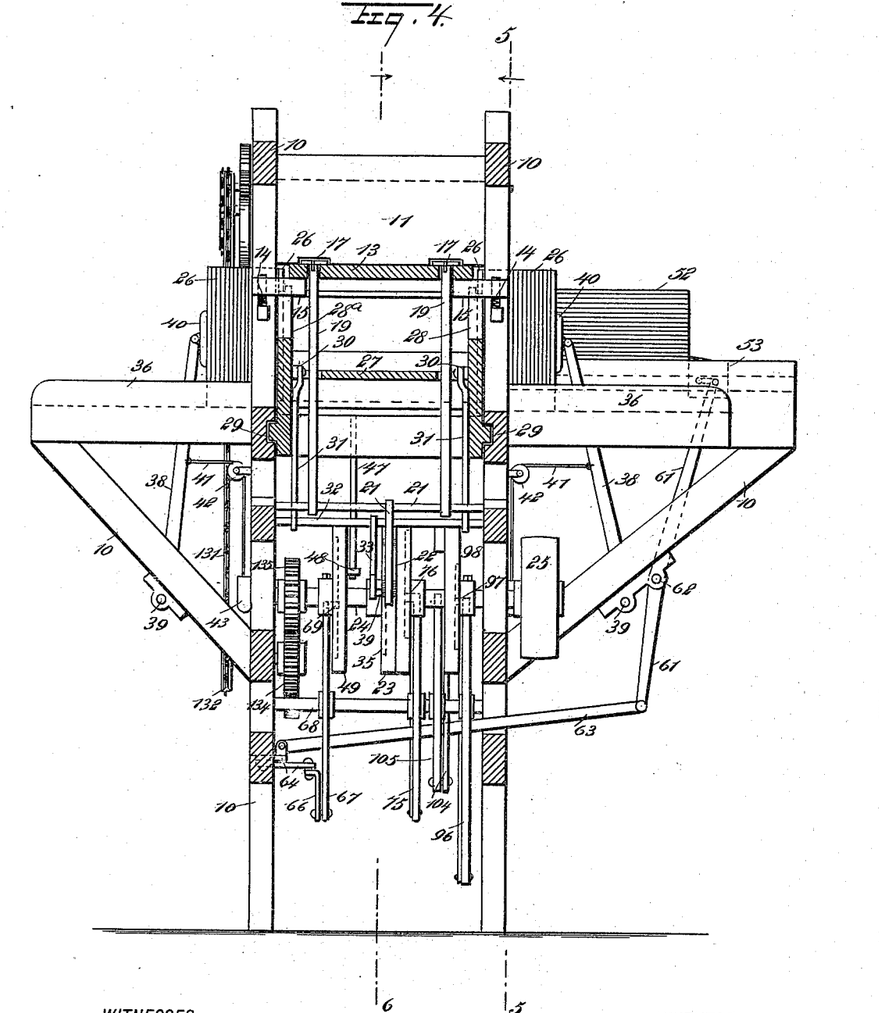
Fig. 4 is a cross-section on the line 4 4 of Fig. 5.

When a board 12 is pushed from the chute 11, (see Fig. 6,) it rests upon the ends of end boards 26, which are pushed inward from opposite sides of the machine upon a carriage 27, the boards resting against shoulders 28 on opposite sides of the carriage, as shown in Fig. 1. The carriage 27 is slidable longitudinally in the machine, moving in tracks 29 on opposite sides of the machine-frame, and the carriage connects by a link 30 with a lever 31 on the transverse shaft 32, which shaft is provided with a crank-arm 33, (see Fig. 4,) having at its lower end a pinion 34, entering a cam-groove 35 in the cam-wheel 23 already referred to. The course of the cam-wheel is such that the lever 33 and levers 31 are moved backward and forward so as to give the requisite reciprocating motion to the carriage 27.

Figure 3:
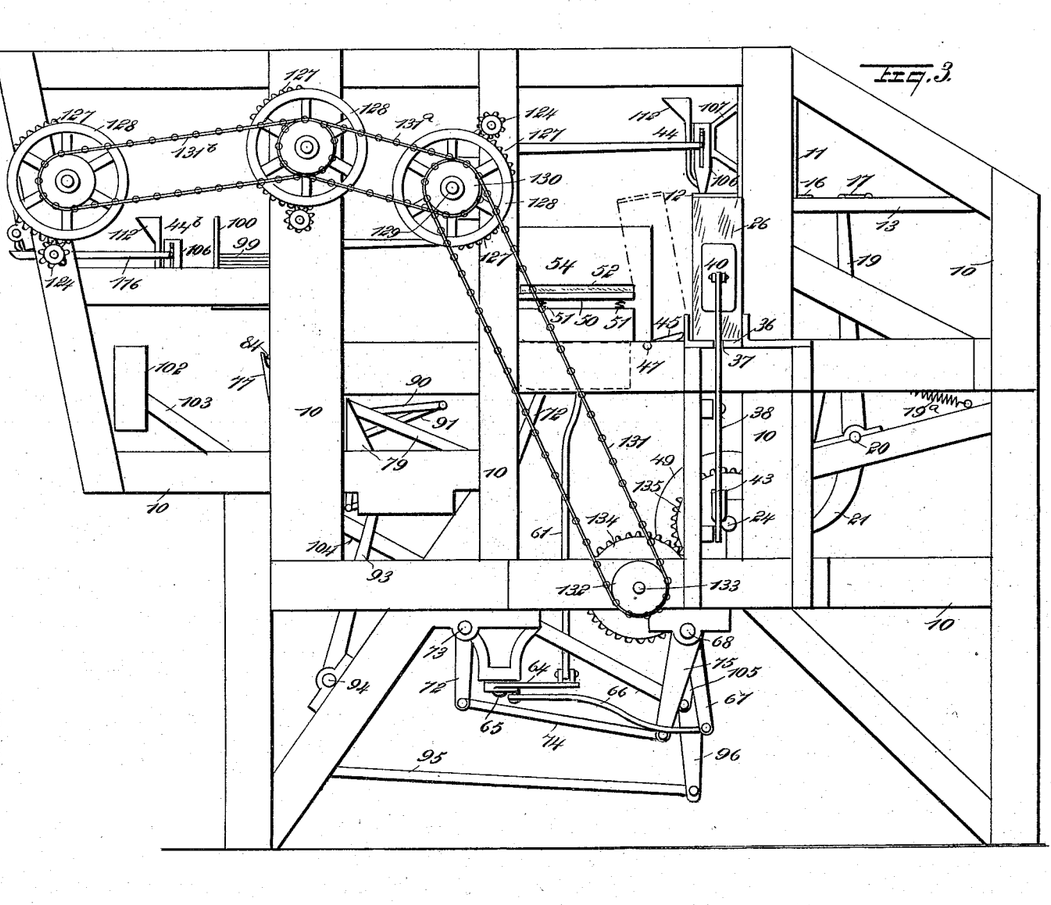
Fig. 3 is a side elevation of the machine.

The end boards 26 are held in oppositely-arranged chutes or holders 36, (see Figs. 1 and 3,) which holders are longitudinally slotted, as shown at 37, to provide for the movement of the arms 38, which are fulcrumed at their lower ends on the machine-frame, as shown at 39, and at their upper ends carry abutment-plates 40, which press against the end boards 26 and so force them inward for use, as above described. The arms 38 are pulled inward by cables 41, which extend over guide-pulleys 42 on the machine-frame, (see Fig. 4,) and at the lower ends the cables have weights 43 of sufficient heft to hold the abutment-plates 40 from the boards 26. When it is necessary to place a quantity of boards in the holders 36, the arms or levers 38 are pulled outward so as to raise the weights 43, and the boards may then be readily placed in the holders.

When a board 12 is placed upon the end boards 26, it is fastened to the end boards by a hammer 44 and suitable nails, the hammer and its actuating mechanism being hereinafter fully described. The first nail will be driven while the hammer and boards are in the position shown in Fig. 6, and after this nail is driven the carriage 27 advances so that the next nail will be driven in its appropriate place, and so on until the side board 12 is nailed firmly to the end boards, and it will be noticed by reference to Fig. 1 that there is a hammer 44 on each side of the machine, so that both ends are simultaneously nailed. After the last nails are driven in the board 12, the carriage 27 advances so that the partially-formed box tips over, as shown by dotted lines in Fig. 6, upon a tilting plate 45, made on the upper end of a shank 46 extending at right angles to the same, as shown clearly in Fig. 5, this lever 46 being fulcrumed at the top, as shown at 47, and having its lower end extending into the path of a pin 48 on a cam-wheel 49 which is carried by the main shaft 24, and this arrangement of pin and lever is such that when the pin strikes the lever the box will be on the tilting plate, as shown by dotted lines in Figs. 5 and 6, and the pin tilting the lever and plate carries the partially completed box to fall over around a table 50, which at one end is pressed upward slightly by springs 51, to better guide the bottom over the side board and end boards, these springs being light, so that when the bottom which lies on the table is nailed to the box ends the said springs will be drawn down to complete a close union of the bottom, ends and sides of a box. The bottoms 52, which are applied to the box, are piled in a holder 53 (see Figs. 4 and 5) on one side of the machine, and the bottoms are fed one by one upon the table 50 and the partially-formed box which embraces three sides of the table.

The bottoms are piled against an abutment 54, (see Fig. 5,) through a slot in which the bottoms slide, and the bottoms are moved by a push-plate 55 which is provided with side grooves 56, (see Fig. 2,) which engage the guide-ribs 57, (see Fig. 5,) beneath the holder 53.

On the push-plate 55 are push-arms 58, which at their outer ends are hinged, as shown at 59, and which at their inner ends are pushed upward slightly by springs 60, the higher end of the push-arms being in position to engage the bottom board of the pile of boards 52, and when the push-plate slides beneath the boards the springs 60 are compressed and permit the push-arms to be easily retracted. The push-plate 55 has a link connection with a laterally-tilting lever 61, (see Fig. 4,) which actuates the push-plate, this lever being fulcrumed near the center, as shown at 62, and having its lower end connected by a rod 63 with a bell-crank 64, which turns horizontally on its fulcrum 65 and connects by a rod 66 with a lever 67 which is fulcrumed on the transverse shaft 68 in the main frame, and the upper end of the lever 67 is provided with a pin 69 entering the cam-groove in the wheel 49, already referred to, this groove being shaped so as to give the necessary rocking motion to the lever 67, and the levers and rods connected as above described cause a reciprocating movement to be imparted to the push-plate 55.

The bottom 52 being pushed upon the partially-formed box, as already described, is nailed by a hammer $44^a$, and the box is then carried along for a further operation upon it by a carriage 70, the rear end of which abuts with one side of the box, and this carriage slides in the tracks 29 already referred to. The carriage is provided with a lug $70^a$ adapted to engage the side of the box, and is connected by a link 71 with a tilting lever 72, which is fulcrumed as shown at 73, (see Fig. 6,) and has its lower end connected by a rod 74 with a lever 75, which is fulcrumed on the shaft 68 already referred to, and at its upper end connects by a pin 76 with a cam-groove in the wheel 23, this groove being made on the opposite side to the groove 35, referred to above. The carriage 70 advances after the bottom 52 is nailed to the ends of the box, and the box thus provided with two ends, a bottom and one side drops side downward between the arms 77 and 78, which are shown clearly in Fig. 6 and in detail in Fig. 7, the arms being mounted on a carriage 79, which slides in tracks 80.

Figure 7:
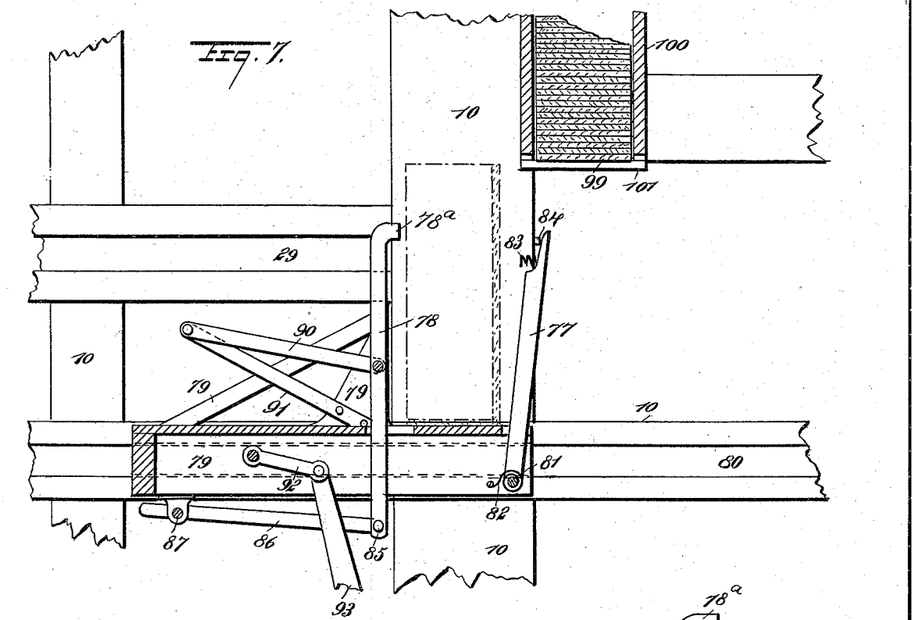
Fig. 7 is an enlarged detail sectional view of the carriage and mechanism for applying the final side to a box.

The arm 77 is pivoted at the bottom, as shown at 81, and is pressed by a spring 82, so as to normally swing forward and form an abutment for the box; but when the carriage 79 is in position to permit a box to drop between the arms 77 and 78, as shown in Fig. 7, the arm 77 is held back by an abutment 84, thus providing a relatively-wide opening into which the partially-formed box may readily drop; but as the carriage 79 advances the arm 77 leaves the abutment 84 and springs against the box bottom. The arm is provided with abutment-springs 83, which strike yieldingly upon the bottom of the box.

Figure 8:
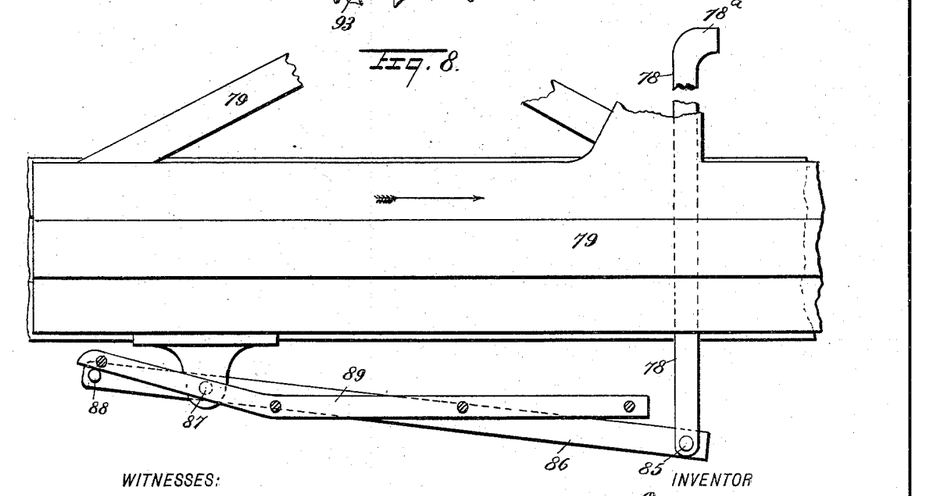
Fig. 8 is an enlarged broken side elevation of a portion of the mechanism shown in Fig. 7.

There are a series of arms 77 and 78, but each is described singly in order that it may be more clearly understood. The arm 78 has a bent upper end 78ª to engage a box side, as presently described, and the arm is at its lower end pivoted, as shown at 85, to a lever 86, which is fulcrumed near one end, as shown at 87, and the lever has near its fulcrumed end a roller 88, which is adapted to engage the inclined track 89, (see Fig. 8,) and as the roller moves along the track it tilts the lever 86 and raises the arm 78, as presently described more in detail. To enable the arm 78 to be accurately guided it is also pivoted to a lever 90, which is pivoted to a lever 91, and the latter is fixed to the carriage 79.

When the carriage 79 advances, the box will be in the position shown by dotted lines in Fig. 7, and the roller 88 of the lever 86, striking the inclined track 89, which is rigid on the machine-frame, causes the long end of the lever 86 to be raised, thus raising the arm 78 and bringing its end 78ª in position to engage a box side 99 (see Fig. 7) and push it from its containing-chute, so as to drop it on the ends of the box in position for nailing. In order that the carriage 79 may be moved, it connects by a link 92 with a tilting lever 93, which is fulcrumed, as shown at 94 in Figs. 5 and 6, and the lever at its lower end connects by a rod 95 with a tilting lever 96, which is fulcrumed on the shaft 68, and has at its upper end a pin 97, entering a cam-groove in the cam-wheel 98, (see Fig. 4,) which is carried by the main shaft 24. The revolution of the cam-wheel and the actuation of the levers above referred to causes the carriage 79 to be reciprocated, as specified.

The sides 99 of the box are carried in a chute 100, which is arranged near the rear end of the machine and above the carriage 79, the chute having at the bottom flanges 101, (see Fig. 7,) which prevent the sides 99 from dropping through. When the carriage 79 moves back, as above described, and the arms 78 push aside from the chute 100, the said side falls upon the unfinished side of the box and is nailed by a hammer 44ᵇ. After this is done the box is finished ready for its cover, which is put on by hand in the usual way, and the box is pushed laterally from the carriage 79 by means of a push-plate 102, which is carried by a bell-crank 103, fulcrumed on one side of the main frame, and the bell-crank is moved by a connecting rod 104, which is actuated by a lever 105, this being fulcrumed on the shaft 68 and having a pin-and-groove connection with the cam-wheel 98, and thus at the proper time the bell-crank is tilted and the push-plate swinging inward strikes one end of the box and pushes the box from the carriage.

Figure 9:
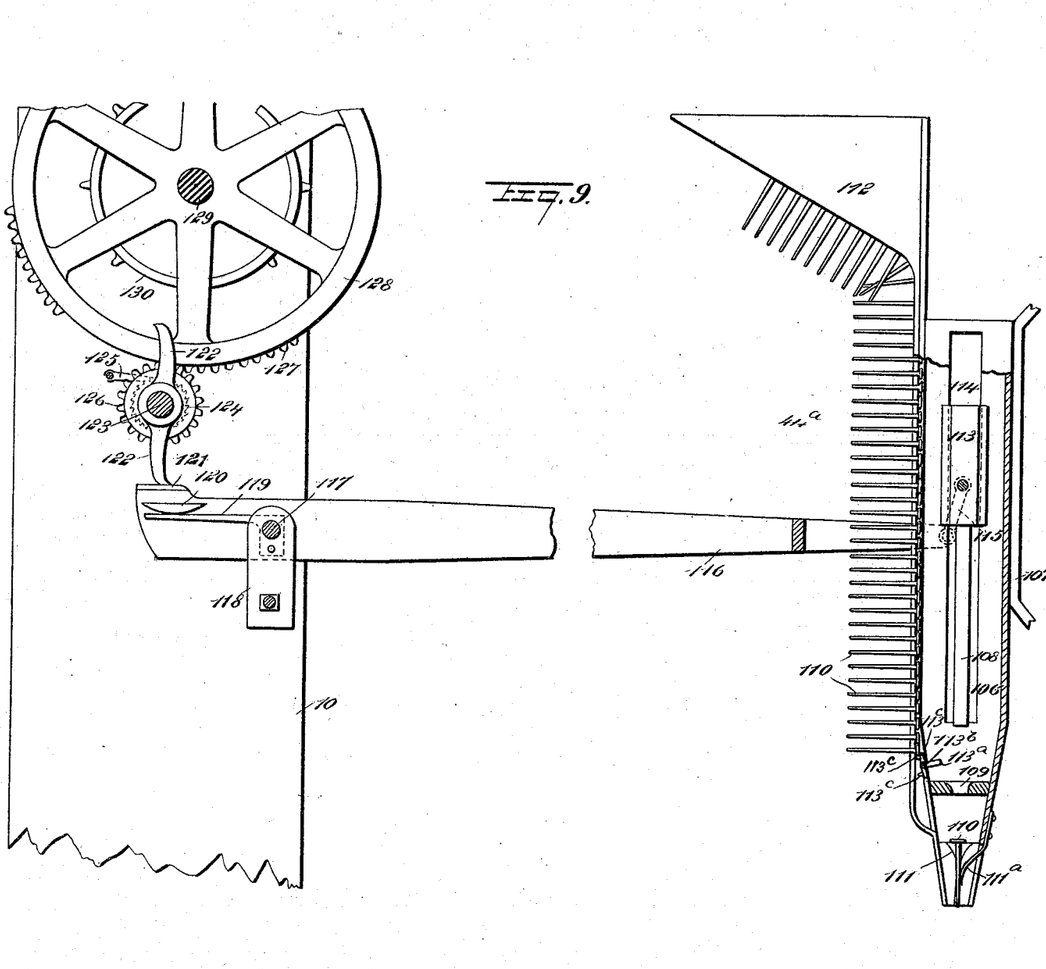
Fig. 9 is an enlarged detail sectional view of one of the hammers of the machine.
Figure 10:
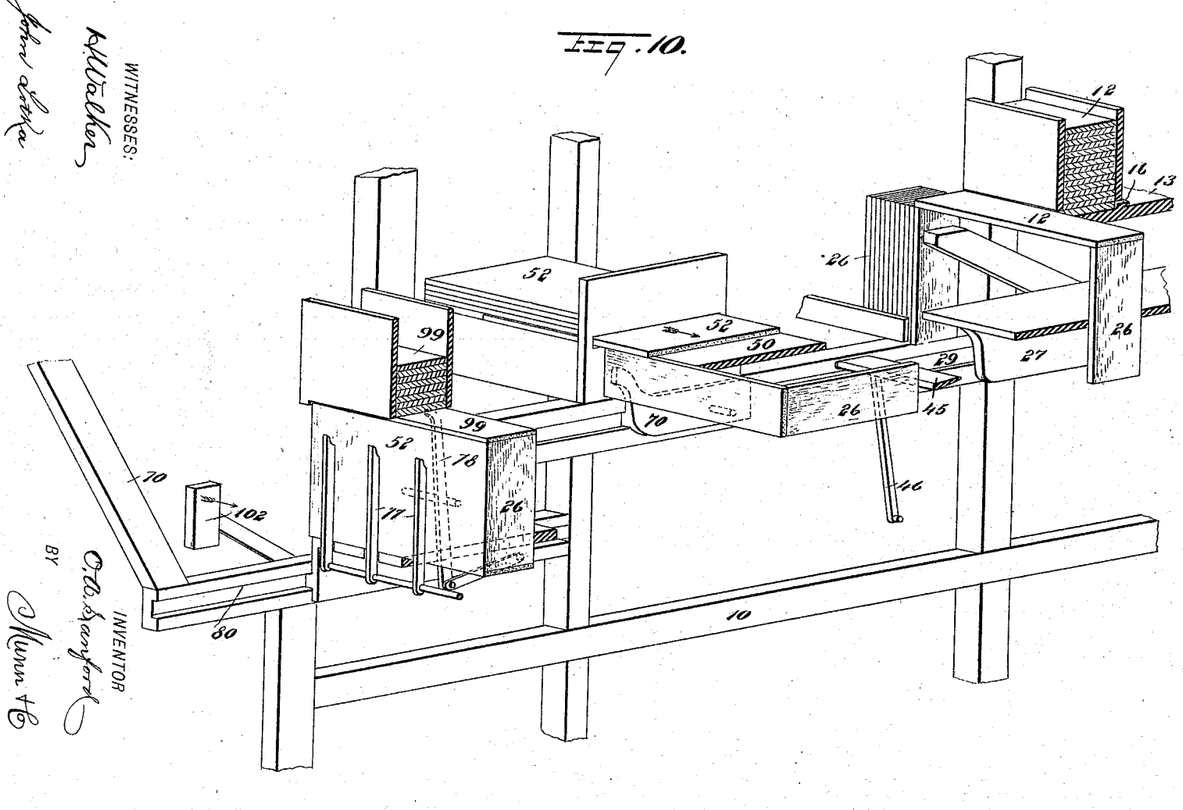
Fig. 10 is a diagrammatic view illustrating the box in different stages of manufacture.

The several hammers 44, 44ª, and 44ᵇ are identical in construction, and this construction is shown clearly in Fig. 9. Each hammer is provided with a case 106 which is secured to a support 107, and the case has in it a vertically-reciprocating plunger 108, which is adapted to move down through a guide 109 and strike and drive a nail 110, which is held at the mouth of the case 106 by the guide 111 and spring 111ª. The nails are fed in a common and well-known way from a pocket 112 through the ordinary slotted chute, which is provided with a detent 113ᵇ, which has arms 113ᶜ which engage the nail-heads and permit them to pass one by one as the detent is rocked; the detent being normally held by gravity or by spring-power in such a position that only the upper arm 113ᶜ extends into the slotted nail-chute, and the detent has an arm 113ª extending into the path of a slide 113ᵈ on the plunger 108, which slide moves in a guide-slot 114 in the case 106, and thus at each stroke of the plunger the detent is actuated and a nail permitted to slide down into the path of the plunger so as to be driven when the latter descends. When the plunger moves upward so as to release the detent, the latter will be turned back to its original position by the weight of the nail resting thereon.

The slide 113 connects by a link 115 with the hammer shank or lever 116, which is fulcrumed near one end, as shown at 117, on a support 118, and the longer end of the lever is normally thrown down by a stiff spring 119, which is rigidly secured to the support 118 and presses against a lug 120 on the lever 116, the lug being curved on the under side in order that it may make a good contact with the spring 119. The lever 116 is also provided with a striking-plate 121, which is located on the shorter end of the lever and which, when struck by the arms 122, causes the lever 116 to swing up against the tension of the spring 119 and raise the plunger 108. When, however, the arm 122 passes off the striking-plate 121, the spring 119 causes the plunger 108 to descend with sufficient power to drive a nail 110.

The arms 122 are arranged relatively opposite each other; but it will of course be understood that a greater or less number of arms may be used, this number depending on the nature of the work and the speed at which the arms are rotated. The arms 122 are carried by a shaft 123, which is provided with a ratchet-wheel 124 and pawl 125 to prevent it from being turned in the wrong direction, and the shaft is driven by a gear-wheel 126 meshing with teeth 127, which are arranged at regular intervals on the face of a large mutilated gear-wheel 128, these gear-sections 127 being of sufficient length to turn the shaft 123 half around when the said sections engage the gear-wheel 124.

Figure 5:
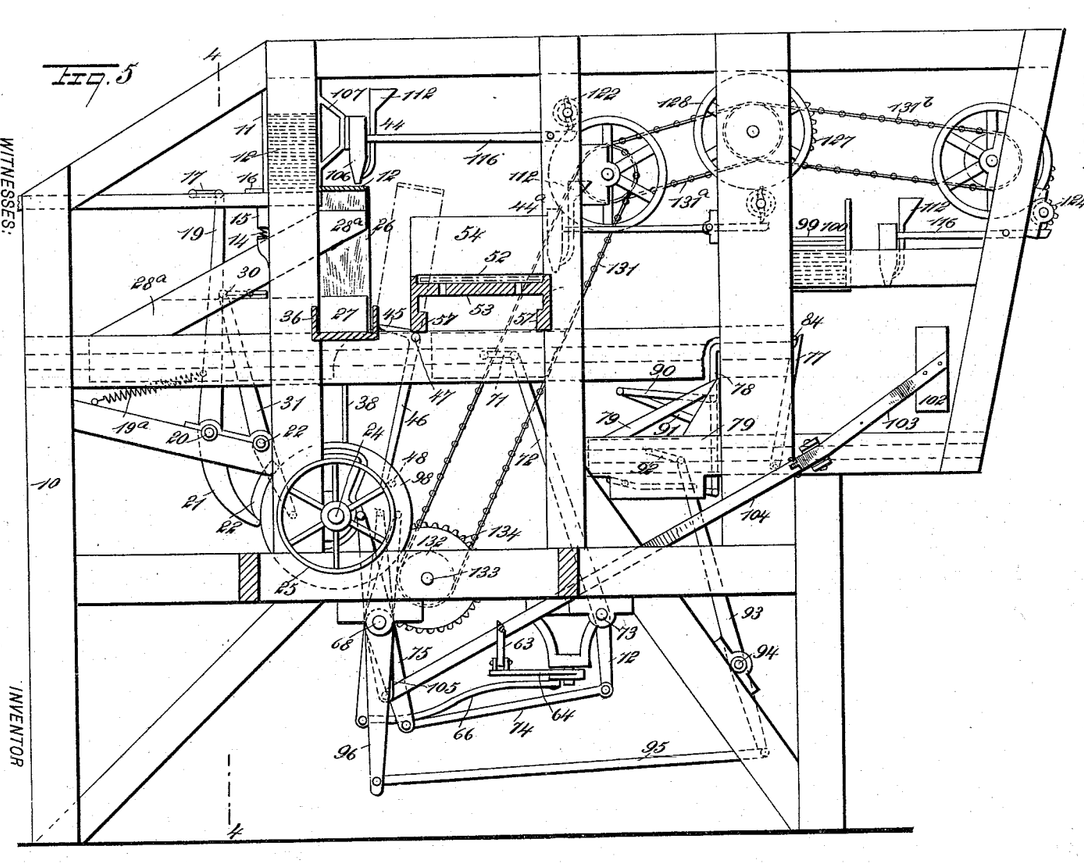
Fig. 5 is a longitudinal section on the line 5 5 of Fig. 4.

The gear-wheel 128 is rigidly attached to or formed integral with a sprocket-wheel 130 on a shaft 129, and the sprocket-wheel is driven by a chain 131 which connects with a sprocket-wheel 132 on the counter-shaft 133, and this latter shaft is driven by a gear-wheel 134 meshing with a gear-wheel 135 on the main shaft 24. The chain 131 drives the shaft of the hammer 44, and a chain 131ª extends from this shaft to the shaft of the hammer 44ᵇ, and a chain 131$^b$ extends from the shaft of the hammer 44$^a$ to the shaft of the hammer 44$^b$, as shown in Fig. 5.

From the foregoing description it will be seen that if the machine is kept provided with boards cut to the right dimensions, and the driving-shaft rotated, a constant succession of boxes will be automatically made and ejected from the rear end of the machine.

Having thus described my invention, I claim as new and desire to secure by Letters Patent—

1. A box machine, comprising oppositely arranged holders for end boards, a holder for side boards located intermediate of the end board holders so that the side boards will be fed to rest with their ends on the end boards, a mechanism for nailing the side board to the end boards, a support for the bottom of the box, a carriage for conveying the side board and the end boards nailed thereto from the first nailing mechanism to the bottom support, a device for feeding the bottoms to the said support, mechanism for nailing the bottom to the side board and end boards, a holder adapted to contain the other side board of the box, conveying mechanism from the bottom-nailing mechanism to the second side board holder, a mechanism for nailing the second side board to the bottom and end boards, and operative connections between the nailing and conveying mechanisms, substantially as described.

2. A box machine, comprising board holders, mechanisms for successively nailing the boards together, conveyers for carrying the partially formed box from one nailing mechanism to another, the conveyers being operatively connected to the nailing mechanisms, and means for turning the partially formed box while traveling from one nailing mechanism to another, substantially as described.

3. A box machine, comprising board holders, mechanisms for successively nailing the boards together, a conveyer for carrying the partially formed box from one nailing mechanism to another, and a tilting plate located adjacent to the said conveyer and constructed to turn the partially formed box while traveling from one nailing mechanism to another, substantially as described.

4. A box machine, comprising board holders, mechanisms for successively nailing the boards together, a conveyer for carrying the partially formed box from one nailing mechanism to another, a movable tilting plate adapted to be engaged by the partially formed box while in transit from one nailing mechanism to another, and means for actuating the plate to turn the box, substantially as described.

5. A box machine, comprising oppositely arranged holders for end boards, a chute to hold the box sides said chute being located above and in the rear of the end board holders, a carriage reciprocating in a direction parallel to the end boards, a slide reciprocating beneath the chute and above the carriage to feed the sides forward so that they will rest on top of the end boards, power hammers arranged above the box ends, and means for operating the carriage, the slide, and the hammers, substantially as described.

6. A box machine, comprising oppositely arranged holders for end boards, a carriage adapted to receive the end boards from the holders, and having reciprocating movement between the said holders, a chute to hold the box sides and located above the end board holders, means for feeding the sides to rest on top of the end board, power hammers arranged above the box ends, and means for operating the carriage, the side feeding mechanism, and the hammers, substantially as described.

7. The combination, with the sliding carriage and mechanism for delivering the box ends and side to the carriage and nailing the said ends and side together, of a table near the carriage, a tilting device to deliver the partially formed box from the carriage to the table, means for delivering the box bottoms upon the table and above the box, and hammers to attach the bottoms to the box, substantially as described.

8. The combination, with the yielding table and the bottom holder at the side thereof, of a mechanism for placing a partially formed box around the table, substantially as described.

9. The combination, with the yielding table held normally in an inclined position, the bottom holder at the side of the table, and means for pushing a bottom from the holder to the table, of a mechanism for placing a partially formed box around the table, substantially as described.

10. The combination, with the table and mechanism for placing a partially formed box around the same so that the table is approximately flush with the upper edges of the box, of a bottom holder at the side of the table, means for delivering a bottom upon the table and above the partially formed box, and mechanism for securing the bottom to the box, substantially as described.

11. The combination, with the table adapted to receive a bottom and to serve as a guide for a partially formed box, mechanism for nailing the bottom to the box, a carriage for removing the box from the table, another carriage beneath the first carriage, a device for delivering the box from the first carriage to the second carriage and simultaneously turning the box, a device for feeding a box side to the box while on the second carriage, and a nailing mechanism for fastening the said side to the box, substantially as described.

12. The combination, with the table adapted to serve as a guide for a box and the hammer adjacent to the table, of the carriage slidable beneath the table, a second carriage beneath the first carriage, means for delivering a partially formed box from the first to the second carriage, a device to feed a box side to the box while in the second carriage, and a hammer to fasten the said side to the box, substantially as described.

13. The combination, with a carriage adapted to carry a partially formed box, of a chute near the carriage arranged to hold box sides, guide arms on the carriage to receive and hold the box between them, and mechanism actuated by the reciprocation of the carriage to lift the arms and bring them into engagement with the box sides in the chute, substantially as described.

14. The combination, with a carriage adapted to hold a partially formed box, of oppositely arranged arms on the carriage to clasp a box, a feed chute above the carriage, a series of levers supporting one set of arms, and mechanism for raising the levers and arms, to bring the latter into engagement with the feed chute, substantially as described.

15. The combination with the carriage, of oppositely arranged guide arms to clasp a box, a feed chute to carry box boards, levers supporting one set of the guide arms, and means, as the inclined track and the rollers on the levers, for raising the arms to engage a board in the chute, substantially as described.

16. The combination with the nailing mechanism, a support for an unfinished box, and mechanism for placing a board upon one open side of the said box, of another nailing mechanism, a conveying mechanism constructed to carry the box from one nailing mechanism to the other, means for tilting the box while in transit from one nailing mechanism to the other, so as to present another open side of the box to the second nailing mechanism, and mechanism for placing a board upon the second open side of the box, substantially as described.

17. The combination, with the carriage and means for conveying a box thereto, of the oppositely arranged guide arms, one set of arms being spring pressed, and an abutment to hold the said arms open when the carriage is in its receiving position, substantially as described.

18. The combination of a nailing mechanism, a support for an unfinished box, mechanism for successively placing boards upon the open sides of the box in one and the same position relatively to the box, and a tilting mechanism for turning the box after a board has been nailed on one open side thereof, to bring another open side in position to receive a board from the same direction or side from which the first named board was supplied, substantially as described.

19. The combination with a nailing mechanism, a support for an unfinished box, and mechanism for placing a board upon one open side of the said box, of another nailing mechanism, a conveying mechanism constructed to carry the box from one nailing mechanism to the other, a tilting plate located adjacent to the conveying mechanism to turn the box and present another open side thereof to the second nailing mechanism, and mechanism for placing a board upon the said second open side of the box, substantially as described.

OTIS A. SANFORD.

Witnesses:
GEO. D. THRELKEL,
J. A. ROBINSON.